United States Patent [19]

Barbe

[11] Patent Number: 4,541,613
[45] Date of Patent: Sep. 17, 1985

[54] GATE VALVE

[75] Inventor: Pierre L. C. C. Barbe, Toul, France

[73] Assignee: Pont-A-Mousson S.A., Nancy, France

[21] Appl. No.: 585,040

[22] Filed: Mar. 7, 1984

Related U.S. Application Data

[63] Continuation of Ser. No. 296,096, Jun. 2, 1981, abandoned.

[30] Foreign Application Priority Data

Jun. 10, 1980 [FR] France ............................ 80 12849

[51] Int. Cl.[4] .......................... F16K 3/12; F16K 3/316
[52] U.S. Cl. .................................... 251/326; 251/327; 251/356; 137/375
[58] Field of Search ...................... 251/326, 327, 356; 137/375

[56] References Cited

U.S. PATENT DOCUMENTS 3,746,304  7/1973  Matthiasi .......................... 251/327

FOREIGN PATENT DOCUMENTS

| 409308 | 2/1925 | Fed. Rep. of Germany | 251/326 |
| 1245664 | 7/1967 | Fed. Rep. of Germany | 251/326 |
| 1285818 | 12/1968 | Fed. Rep. of Germany | 251/327 |
| 1550575 | 11/1969 | Fed. Rep. of Germany | 251/326 |
| 1304240 | 8/1962 | France | 251/326 |

Primary Examiner—Arnold Rosenthal
Attorney, Agent, or Firm—Sughrue, Mion, Zinn, Macpeak, and Seas

[57] ABSTRACT

In this gate valve, two semi-seal lines between the closure member and the seat cross at the level of the flow axis through the valve. In this way, the overall axial size and the force for operating the valve are reduced.

9 Claims, 41 Drawing Figures

GATE VALVE

This application is a continuation of application Ser. No. 296,096, filed June 2, 1981 now abandoned.

DESCRIPTION

The present invention relates to a gate valve of the type comprising a body having a cylindrical flow pipe assumed to be horizontal and defining a seat surface, and a closure member provided with a seal rib of elastomer and guided in vertical translation, said rib being applied against the seat surface of the body and having the same general shape as the seat.

Conventional gate valves of this type have a seal line having the general shape of a wedge. They must have an axial dimension which is compatible with the required distances between the flanges of piping and they must ensure a reduced wear of the elastomer seal when repeatedly opening and closing the valve.

Now, these two conditions oppose each other. In order to decrease the wear of the seal the friction of this seal against its seat required in order to achieve the desired compression of the elastomer must be decreased and consequently the travel of the gate at each point of the latter must be decreased between the moment the seal touches the seat and the moment the considered compression is achieved. For this purpose, the angle between the seat surface and the direction of displacement of the gate must be increased, but, unfortunately, this increase increases the overall axial size of the gate valve.

The Applicant has proposed a solution to this problem in French patent No. 71 16057 and the corresponding certificate of addition No. 72 11641 published under Nos. 2 139 616 and 2 178 457 respectively.

Indeed, the seat and the closure member have in these documents, on each side of a plane of symmetry containing the axis of the operating rod and perpendicular to the axis of the flow tube, two continuous closed conjugate surfaces which gradually vary in a sinuous manner.

In the various embodiments of this patented gate valve, each ruled surface forming a seat on each side of said plane of symmetry comprises an upper curved portion roughly transverse to the axis of flow, a lower curved portion coinciding with the inner cylindrical flow surface, and therebetween, above and below a diametral zone represented in projection by the flow axis, an intermediate roughly helicoidal transition portion in the shape of a rotating ramp which connects said upper and lower portions by extending around the cylindrical flow surface as close as possible to the latter.

This ruled surface, i.e. surface formed by rectilinear generatrices, has a mean seal line which is a closed curve. At each point of this seal line, the plane tangent to the surface forming the seat (plane formed by the rectilinear generatrix and by the tangent to the seal line at this point) makes an angle which is at least equal to a predetermined angle which is, for example, 20°, with the direction of translation of the closure member or the axis of the operating rod.

Along a seal zone extending over more than one half of the seal line, the angle between the plane tangent at each point to the seal line and the axis of the operating rod is roughly constant.

The lower generatrices of the flow tube may be rectilinear or have a deviation forming a hollow or a projection against which the lower part of the closure member is applied.

Owing to this arrangement, the sealing contact between the seat and the closure member through the rubber seal element is completely continuous throughout the closed contour of the seat so that the gate valve is absolutely fluidtight in the closed position thereof, even and in particular in said intermediate portion of transition of the seal surface.

Further, owing to the aforementioned minimum angle of 20°, the sliding of the seal on the seat when closing the gate is substantially reduced with respect to that which occurs in prior gate valves. Consequently, there is less wear of the sealing element on the closure member.

An object of the invention is to provide another solution compatible with the foregoing solution and more advantageous from the point of view of the force required for opening the closure member.

For this purpose, the invention provides a gate valve of the aforementioned type wherein the seal line of the seat, seen in a direction perpendicular to the axis of the flow pipe, has the general shape of an X and is obtained, throughout or substantially throughout its length, by translation of two half seal lines towards each other along said axis, said half seal lines having together the general shape of a wedge.

In an advantageous embodiment, which ensures a minimum of axial overall size, each half seal surface is such as that defined in French patent No. 71 16057 or in the corresponding certificate of addition No. 72 11641 briefly mentioned hereinbefore.

In this case, and in order to simplify manufacture, the part of each half seal surface located above the zone of the flow axis may be replaced by two portions of a plane convergent towards said axis and extended by curved surfaces for connection to the surfaces located below said zone.

When, in the lower portion of the seat, the angle between the axis of the operating rod and the plane tangent to the seal surface varies, advantageously the crest line of the seal bead is defined in such manner as to meet simultaneously the seat surface at all points thereof except in the lower portion of said surface where, upon this first contact, there is a radial clearance which progressively increases on each side to the lower point of the flow cavity. In this way the uniformity of the crushing of the bead is improved.

Thus, during the closure member closing stage, once the seal contact between the closure member and the seat has been achieved on the major part of the seal bead, except in said lower part, the gaps between the seal bead and the seat, which increase in the lower loops of each seal line in the direction away from the diametral plane of the flow tube, are progressively reduced and the seal contact is achieved progressively followed also by a progressive compression of the seal element. This lack of simultaneousness of the seal contact throughout the periphery of the seal line and this progressivity of the coming into contact with the seat and of the radial or perpendicular compression of the bead or of the seal element at least partly compensate, in respect of the uniformity of the crushing of the bead at the end of the closing travel of the valve member, for the variation in the angle $\alpha$ between the axis of the operating rod and the plane tangent to the seal surface along its mean line in the lower portion of the seat surface.

A complete or practically complete uniformity of the crushing of the bead can be obtained when said clearance varies in accordance with a law of the type:

$$j = a \sin \alpha - b$$

in which a and b are constants. This may be simply achieved in the case of a flow tube having a circular section by giving the lower part of the bead, when viewed along the axis of flow, a circular shape having a radius exceeding that of the flow cavity.

In order to take into account manufacturing requirements it may be desirable to arrange that the crossing points of the X be replaced by flat surfaces on the seat surface and on the seal line by segments of a straight line which are roughly vertical when seen in side elevation.

In the case where the flow tube has in the region of the closure member an inner or outer projecting region, the lower part of the seat surface is modified in corresponding manner with surfaces which merge into the remainder of this surface.

The invention will be described in more detail with reference to the accompanying drawings which show solely some embodiments of the invention. In the drawings.

The gate valve illustrated in FIGS. 1 to 4 comprises a T-shaped body 1 which is moulded from cast iron or some other metal alloy or from a plastics material. The body 1 has a tube or pipe 2 having an axis X—X for the entry and exit of the fluid passing through the valve, this tube 2 being adapted to be connected, for example by flanges, to piping (not shown), and a tubular housing 3 having an axis Y—Y perpendicular to the axis X—X and forming the stem of the T. For the purposes of the description, it will be assumed that the axis X—X is horizontal, and the axis Y—Y vertical, the housing 3 extending upwardly from the tube 2. Only the lower part of the tubular housing 3 has been shown and its other part comprises in the known manner a cap which closes the body and acts as a liquidtight guide for the operating rod of the closure member.

The tube 2 has a cylindrical inner cavity 4 of circular sectional shape and the tubular housing 3 has an inner cavity 5 of axis Y—Y which is also cylindrical but has a roughly elliptical sectional shape. The cavity 4 is interrupted in the extension of the housing 3 by a seat surface 6 of special shape described hereinafter.

Figure 1:
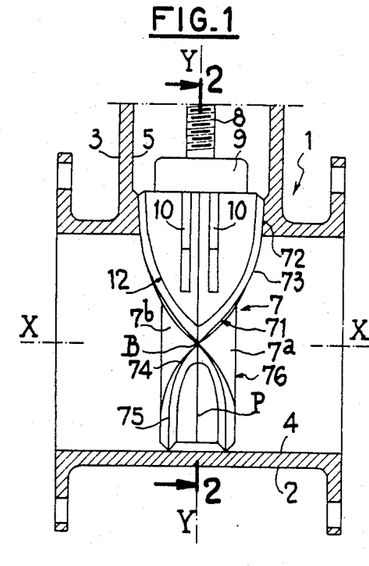
FIG. 1 is a longitudinal sectional view of a gate valve according to the invention with its closure member in the closing position and shown in side elevation, the upper part of the gate valve not being shown.
Figure 2:
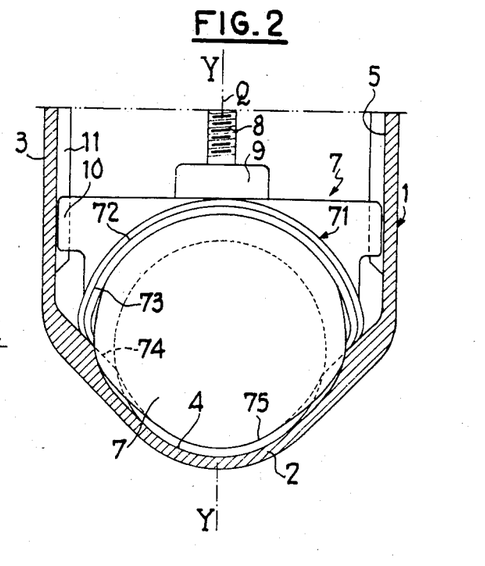
FIG 2 is a cross-sectional view, taken on line 2—2 of FIG. 1, i.e. in the transverse plane of symmetry of the gate valve.

A closure member or gate 7 operated by a screwthreaded operating rod 8 of axis Y—Y is adapted to be applied against the seat 6 by translation between an upper open position and a lower closed position. The upper end of the screwthreaded rod is mounted to be rotatable but prevented from moving in translation in the upper cap of the body 1 and its lower end cooperates with an operating nut (not shown) which is trapped in an upper case 9 of the closure member. The closure member 7 has, in the same way as the body 1, planes of symmetry, namely the vertical plane Q containing the axes X—X and Y—Y and the vertical plane P which contains the axis Y—Y and is perpendicular to the axis X—X.

The closure member 7, which will be described hereinafter, may be made from any suitable material, such as gray cast iron, spheroidal graphite cast iron, steel, a copper alloy, a plastics material, and may be manufactured by any suitable method (precision moulding, die casting, machining, etc.). In the presently-described embodiment, the closure member is hollow and consists of two semi-closure members 7a and 7b which are assembled in the manner described hereinafter and completely covered with rubber.

The closure member 7 has the general shape of a plate perpendicular to the axis X—X and adapted to the dimensions of the cylindrical cavity 4 of the flow tube 2 and to the shapes of the seat 6 so as to be inserted between the two halves of the tube 2 and be applied in a fluidtight manner against the seat 6. It has in its upper part, apart from the case 9 containing the nut of the operating rod 8, two pairs of lateral guide ribs or ears 10 which are parallel to the axis Y—Y and located on each side of the vertical plane Q.

The guide ribs 10 cooperate with two vertical guide ribs 11 contained in the plane of symmetry P of the gate valve inside the housing 3 and projecting from the cavity 5 of the latter.

Two embodiments of the surface of the seat 6 and of the closure member 7 will now be described.

First embodiment of the seat and closure member (FIGS. 1 to 4 and 20).

Figure 19:
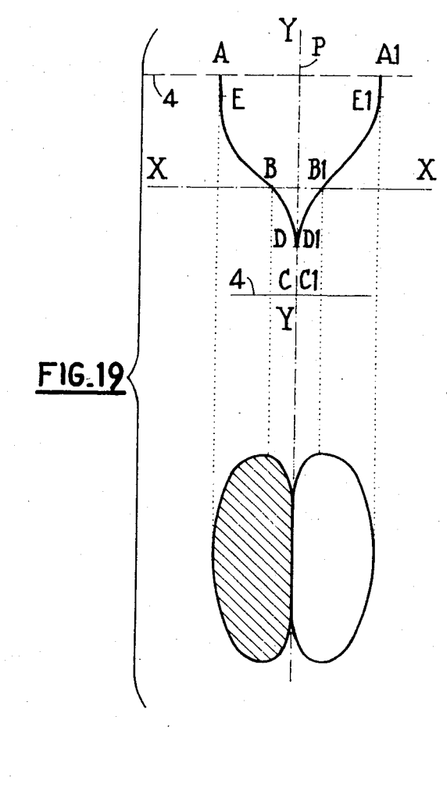
FIG. 19 is a diagram in elevation and in plan illustrating the seal line of a gate valve according to the French patent No. 71 16057 of the Applicant.
Figure 20:
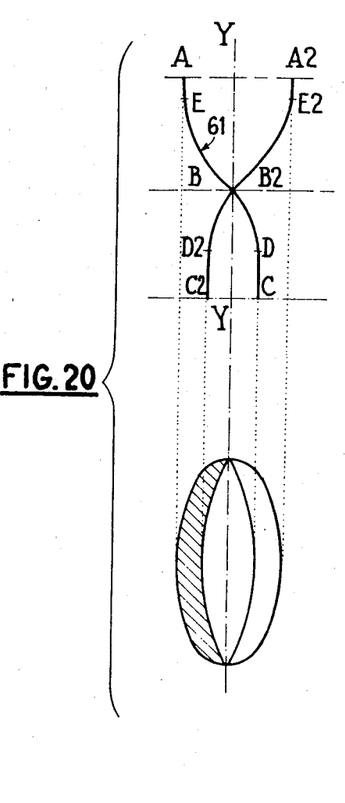
FIGS. 20 and 21 are diagrams similar to FIG. 19 showing, for purposes of comparison, the seal lines of two embodiments of the present invention.

The shape of the seat 6 is directly derived from that described in the aforementioned French patent No. 71 16057 of the Applicant, as can be seen from a comparison of the diagrams of FIGS. 19 and 20.

According to said French patent No. 71 16057 and as geometrically illustrated in FIG. 19, the transverse profile of the seat, or more precisely the projection of the curved and continuous seal line on the plane of symmetry Q, is represented by the line A, B, D, C and $A^1$, $B^1$, $D^1$, $C^1$. This profile comprises two curves which are symmetrical with respect to the plane P and has the general shape of a boat hull. There will be recognized the upper curve portions A, E, and $A^1$, $E^1$ which are transverse with respect to the flow axis X—X, i.e. substantially vertical, the lower curve portions D, C, and $D^1$, $C^1$ which coincide with the line representing the plane P and are wholly located on the cylindrical flow cavity A, and the intermediate transition portions E, B, D and $E^1$, $B^1$, $D^1$ which are helicoidal and intersect the axis X—X at B and $B^1$ and which connect the upper transverse portions to the lower portions of each semi-seal line. The lines A, B, D, C, and $A^1$, $B^1$, $D^1$, $C^1$ are the projections of the mean line of the seat 6 which comprises two ruled surfaces whose generatrices are perpendicular to the axis X—X in the upper portions A, E, and $A^1$, $E^1$, parallel to the axis X—X in the coinciding lower portions D, C, and $D^1$, $C^1$, and have an evolutive orientation between perpendicularity and parallelism relative to the axis X—X in the manner of the steps of a spiral staircase in the intermediate portions E, B, D, and $E^1$, $B^1$, $D^1$.

Figures 18, 22, 23, 24:
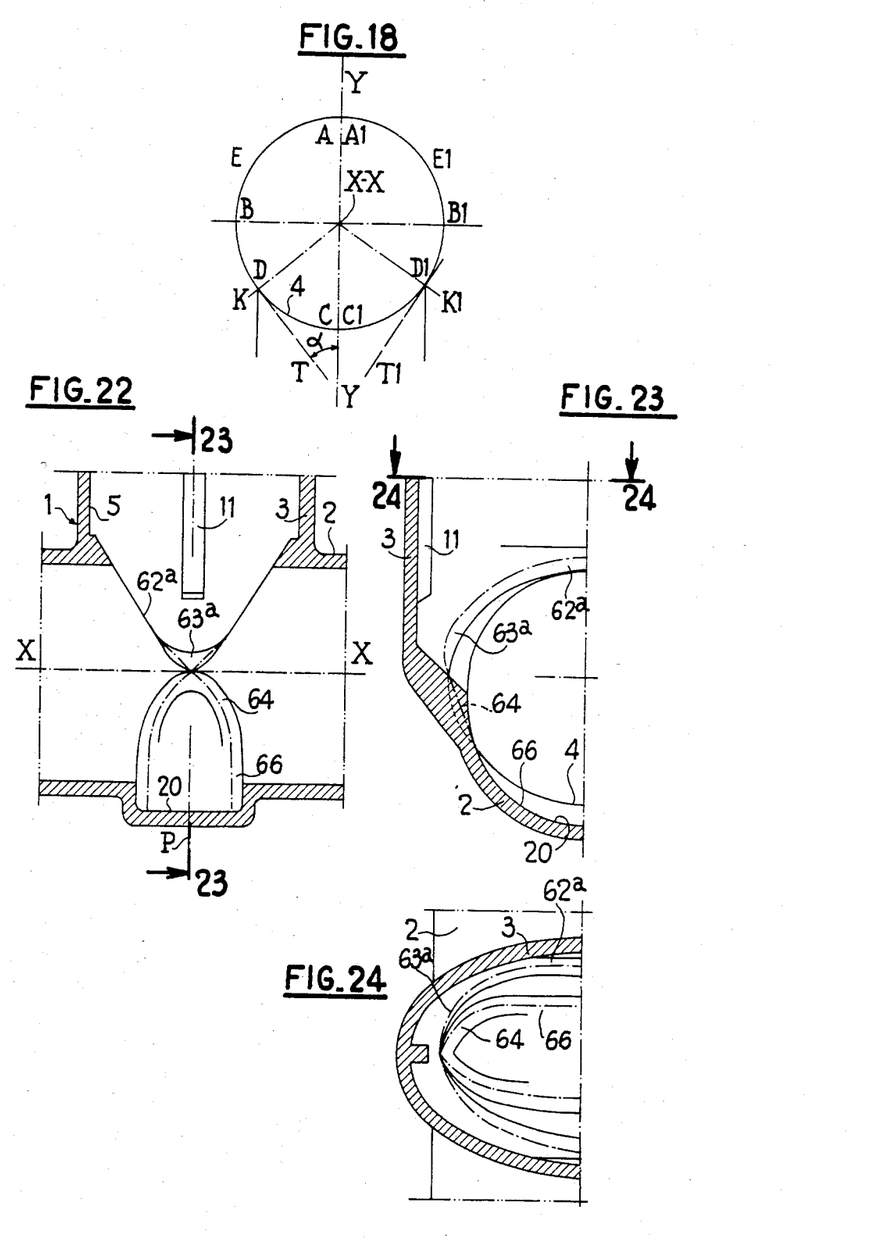
FIG. 18 is a diagram in cross-section illustrating the angle the planes tangent to the seal surface make with the direction of the operating rod in the lower part of the connection with the cylindrical flow surface shown by a circle.
FIG. 22 is a longitudinal sectional view of a modification of the body of the gate valve according to the invention in the case where the flow tube includes a hollow cavity with vertical walls in the lower part of the travel of the closure member.
FIGS. 23 and 24 are respectively half-sectional views taken along lines 23—23 of FIG. 22 and FIG. 24—24 of FIG. 23.

It will be moreover recalled that the seal lines A, E, B, D, and $A^1$, $E^1$, $B^1$, $D^1$, have at every point a plane tangent to the seat surface 6 which forms with the axis Y—Y an angle $\alpha$ which is roughly equal to a predetermined value, for example 20° (tangent planes indicated by lines $K^1$, T and $K^2$, T in FIG. 18). Between D and C and $D^1$ and $C^1$, the angle $\alpha$ gradually changes from the minimum value 20° to 90°.

The upper part of the diagram of FIG. 20 is the projection on the same plane Q of the seal line of a valve according to the present invention. The curves A, E, B, D, C and $A^2$, $E^2$, $B^2$, $D^2$, $C^2$ are respectively identical to the curves A, E, B, D, C and $A^1$, $E^1$, $B^1$, $D^1$, $C^1$ of FIG. 19 and comprise the same upper portions A, E, $A^2$, $E^2$, lower portions D, C and $D^2$, $C^2$, and intermediate transition and connecting portions E, B, D, and $E^2$, $B^2$, $D^2$ between the upper portions and the lower portions and satisfy the same geometric definitions and the same is true of the conditions concerning the planes tangent to the seat surface along these two curves.

But, in order to reduce the longitudinal overall size of the seat (distance A, $A^1$ and A, $A^2$ of FIGS. 19 and 20), the two symmetrical curves have been moved together by translation in a direction parallel to the axis X—X so that they cross at B or $B^2$ (FIG. 2) on the axis X—X. Consequently, the maximum longitudinal overall size A, $A^2$ relative to the axis X—X is less than the preceding overall size A, $A^1$, the decrease in the overall size being equal to the extent of the considered translation.

Figure 3:
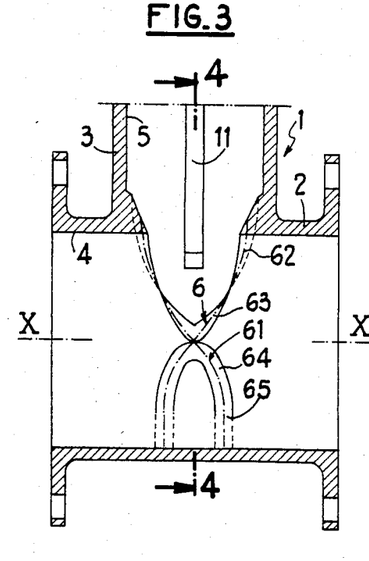
FIG. 3 is a longitudinal sectional view similar to FIG. 1 of the gate valve without its valve member, said view illustrating the seat.
Figure 4:
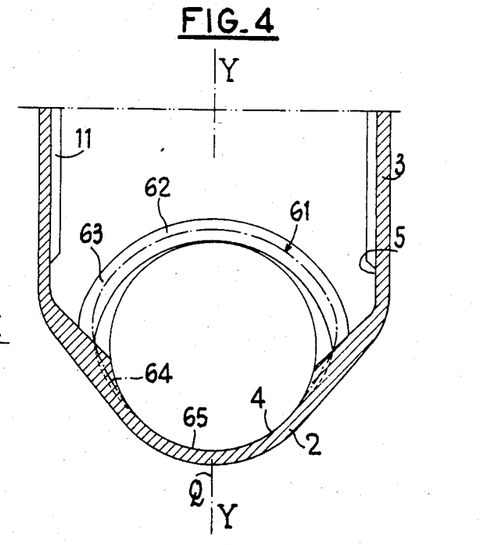
FIG. 4 is a cross-sectional view taken on line 4—4 of FIG. 3.

Consequently, the seal surface 6 has a mean seal line 61 which constitutes, in projection on the plane Q, all of the curves A, E, B, D, C and $A^2$, $E^2$, $B^2$, $D^2$, $C^2$. The seal line 61 is illustrated in FIGS. 3 and 4 by a dot-dash line on the seat surface 6 and is embodied by the crest 71 of an elastic seal bead 12 carried by the closure member 7, this crest having exactly the same shape. The line 61 is formed by both the two lines which cross at the ends of the horizontal diameter of the tube 2 on the axis X—X. The portions of each half of the seal surface 6 are correspondingly:

two upper portions 62 located roughly in a transverse plane relative to the flow axis X—X corresponding, for the seal line, to A, E, and $A^2$, $E^2$;

two upper intermediate portions of transition 63 which are helicoidal and located above the diametral zone of the flow axis corresponding to E, B and $E^2$, $B^2$;

two lower intermediate portions of transition 64 which are horizontal and located below the diametral zone of the flow axis X—X and on the other side of the vertical plane P with respect to the preceding, corresponding to B, D, and $B^2$, $D^2$, and two cylindrical lower portions 65 which coincide with the flow cavity 4 and are parallel to the flow axis X—X, corresponding to D, C and $D^2$, $C^2$.

All these surface portions are continuously connected to each other and corresponding to these surface portions on the seat are seal line portions 72 to 75 respectively on the seal bead 12 of the closure member 7.

The seal lines 61 of the seat 6 and 71 of the closure member 7 have consequently a generally X shape when viewed in side elevation. Each semi-line located on one side of the plane P has a point of inflection B at each end of the horizontal diameter of the flow tube 2. In the same way there are obtained seal surfaces which cross on the diametral zone of the flow axis X—X. Below this diametral zone, the surfaces which diverge in the upper part converge toward the diametral zone on the axis X—X. Below this diametral zone, the seal surfaces are convergent from the lower part toward the diametral zone of the axis X—X.

In other words, the surface portions located above the diametral zone of the axis X—X and on one side of the plane of symmetry P are extended below this diametral zone and on the other side of said plane of symmetry P. It is this extension which provides the continuity, notwithstanding the geometric discontinuity indicated by the turning back point B, for the sealing surface portions located on the same side of the plane of symmetry P.

Figure 12:
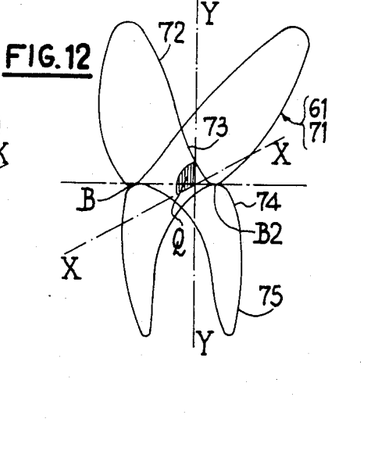
FIG. 12 is a perspective view of the seal line according to this second embodiment.

As shown in perspective in FIG. 12 in respect of a modification described hereinafter, the seal line 61, 71 is in fact a closed curve extending round the entire periphery of the seal surfaces and therefore surrounding the cylindrical flow cavity 4, with two points of inflection B, $B^2$ which are symmetrical with respect to the plane of symmetry Q containing the axes X—X and Y—Y (plane shown in FIGS. 1, 3 and 20). The lines 61 and 71 coincide in the closed position of the gate valve.

On the closure member 7 (FIG. 11) the seal bead 12, which has a roughly circular cross-section, extends around a closure plate 76 whose mean plane is the plane Q and comprises a lower portion 77 having a thickness (i.e. dimension in the direction of axis X—X) and a semi-cylindrical shape, the horizontal diameter thereof being located above the flow axis X—X, then a parallelepipedic intermediate portion 78 of the same thickness and then an upper portion 79 having a wedge shape whose edge or crest crosses the axis X—X at a right angle and which diverges upwardly up to the upper loops of the seal line 71. The wedge shape has in its upper part a dimension in the direction of axis X—X which is greater than that of the intermediate and lower portions of the plate 76. The lateral guide ears 10 project from the wedge 79 on each side of the plane P.

Figure 11:
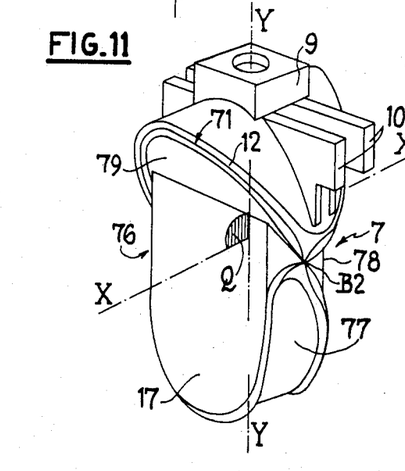
FIG. 11 is a diagrammatic perspective view of the closure member of the embodiment shown in FIGS. 5 to 10.

The seal rib 12 extends along the entire edge of the wedge 79 and the lower portion of the semi-cylindrical region 77 at each axial end of the latter. Thenceforth, the two lower curved portions of the seal surface unite at the apices of the wedge shape 79 and converge toward the diametral zone of axis X—X.

According to FIGS. 2 and 4, showing the closure member and the seat taken in the transverse plane of symmetry P, the different portions of the seal surfaces extend symmetrically with respect to the plane Q in the plane P along arcs having the following approximate values on each side of the plane of symmetry P, which must therefore be counted twice:
(a) 62-72: about 60°;
(b) 63-73: about 30°;
(c) 64-74: about 30°;
(d) 65-75: about 60°.

The embodiment of the closure member 7 which is common to the first and second embodiment will be shown subsequently.

Second embodiment (FIGS. 5 to 12 and 19)

Figure 21:
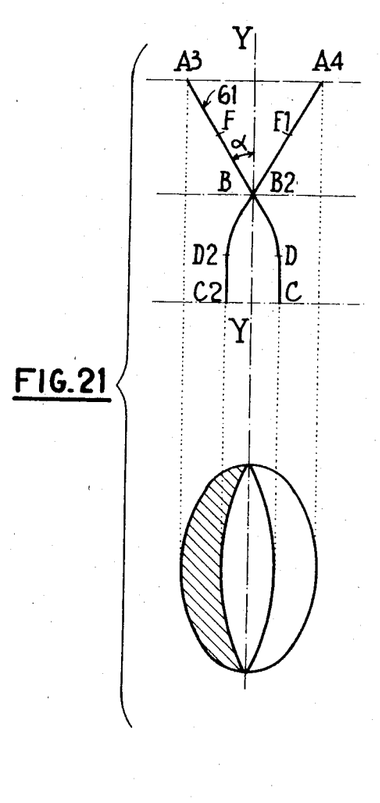

In order to understand the structure of the second embodiment as compared to the first embodiment the diagrams of FIGS. 20 and 21 will be compared.

While the principle of crossing seal lines and surfaces has been retained, for the purpose of simplification, the portions 62-72 and 63-73 (or A, E, B, and $A^2$, $E^2$, $B^2$) located above the diametral zone of axis X—X, i.e. the upper portions and upper intermediate portions having a continuous curvature and extending helically, have been replaced by two convergent planes shown by the rectilinear line $A^3$, F, B and $A^4$, $F^1$, $B^2$ (FIG. 21), the semi-angle at the apex $\alpha$ being greater than or equal to 20° relative to the axis Y—Y.

Below the diametral zone of axis X—X, the seal surfaces and lines of the first embodiment have been retained.

It can be seen that this simplification in the upper zone of the seal surfaces and lines is obtained at the cost of a slight increase in the maximum longitudinal overall size for a given angle $\alpha$, since the distance $A^3$, $A^4$ of FIG. 21 is greater than the distance A, $A^2$ of FIG. 20. But this maximum longitudinal overall size nonetheless remains for a given angle $\alpha$ less than that of the prior gate valve (A, $A^1$ of FIG. 19).

More precisely, in this embodiment, the upper portion 62 of the seat is formed by:
two semi-elliptical planar surfaces 62a which are the intersections of two convergent planes symmetrical with respect to the plane P with the wall of the tube 2. These semi-elliptical surfaces extend from the junction between the tubular housing 3 and the tube 2 to a zone located roughly mid-way between the horizontal diametral plane containing the axis X—X and the junction between the tubular housing 3 and the tube 2 (segments $A^3$, F and $A^4$, $F^1$ of FIG. 21);
two intermediate ruled helicoidal surfaces 63a which extend to the aforementioned diametral plane, corresponding to the portions F, B and $F^1$, $B^2$ of FIG. 21. These surfaces 63a ensure the progressive transition with the two lower transition surfaces 64.

The two lower transition surfaces 64 are, as in the first embodiment, twisted surfaces which extend from a zone located at the level of the axis X—X to about half-way between the axis X—X and the lower generatrix of the cavity 4. It concerns twisted surfaces in the shape of turning ramps, i.e. ruled helicoidal surfaces generated by generatrices based on a curve of intersection of the surface 6 with the cylindrical flow cavity 4. The surfaces 64 gradually change in rotating about a vertical axis when their curve of intersection with the cylindrical cavity is followed. The surfaces 63a and 64 are such that a tangent plane at all points of the median line or seal line 61 makes a minimum angle of 20° with the axis Y—Y, this angle gradually increasing to 90° in the lower part where the surfaces 64 are connected to the surfaces 65 coinciding with the cavity 4.

The median seal line 61 of the seat surface 6 is, as before, formed by two lines which are symmetrical with respect to the plane of symmetry P of the gate valve. These two lines appear in the plan view of FIG. 9 and on the lower part of FIG. 21. They are closed and continuous but have large changes in direction or line (turnback points) on the line corresponding to plane P. The line 61 is also represented in perspective in FIG. 12. As before, it is along this seal line 61, common to the seat 6 and the closure member 7 (identical line 71), that the seal element of the closure member 7 bears against the seat 6.

In projection on the plane Q (FIGS. 5 and 7), the line 61 forms an X consisting of a V, whose apex points downwards, superimposed on a lower inverted U. In the first embodiment, the upper V is replaced by an upper U.

Figures 5, 6:
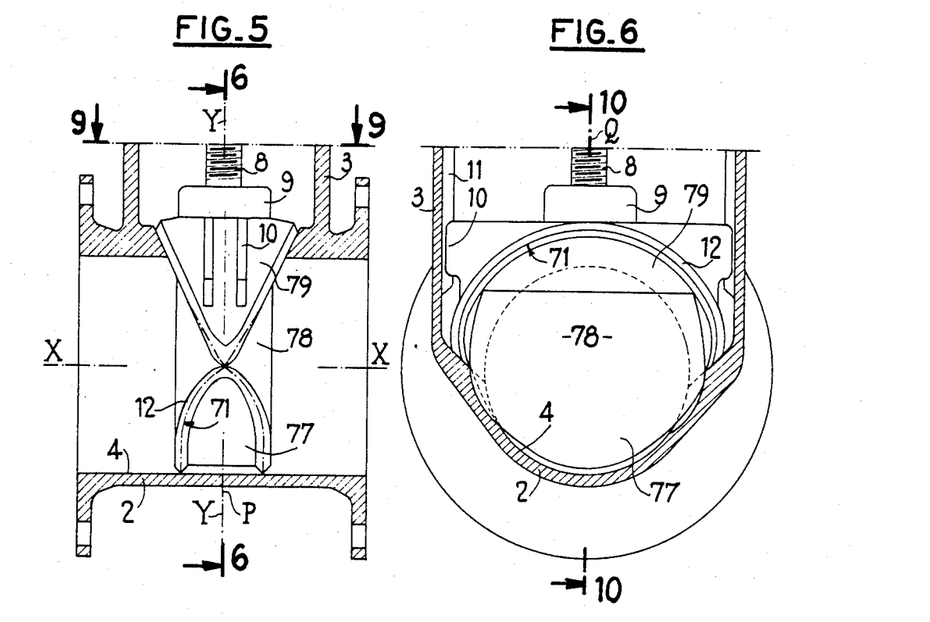
FIGS. 5 to 8 are views similar to FIGS. 1 to 4 of a second embodiment of the gate valve according to the invention.
Figures 7, 8:
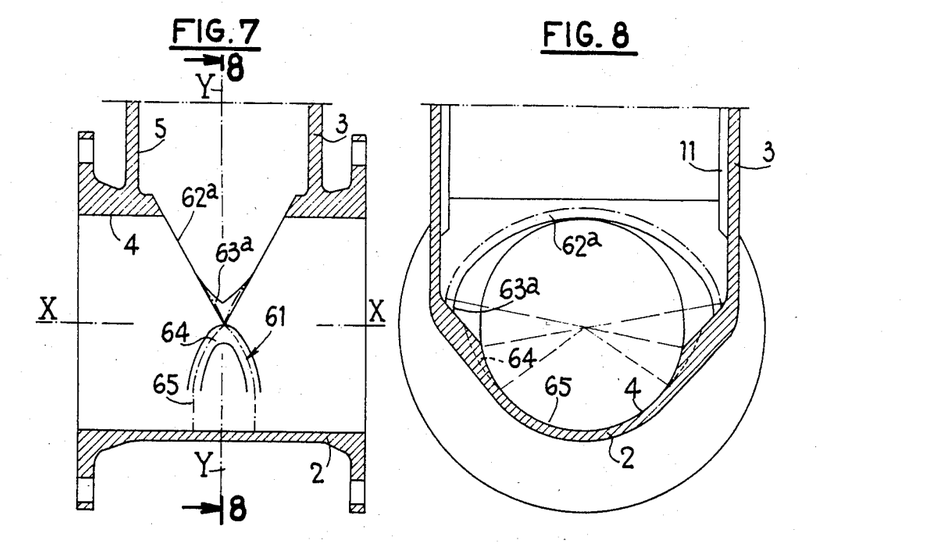
Figure 9:
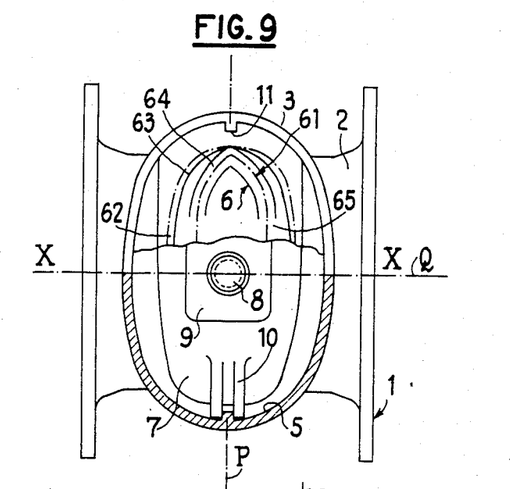
FIG. 9 is a sectional view taken on line 9—9 of FIG. 5 with a part cut away.

In the plane of projection P, which is that of FIG. 6, the seal bead 12 and the seal line 71 only appear in the upper seal portion 62, 72 in the form of a semi-ellipse in a portion of the intermediate zone 63, 73 and in the lower portion 65, 75, whereas they are hidden in the portion 64, 74.

The two parts 7a, 7b of the closure member 7 in the two foregoing embodiments have a construction which will now be described.

Figure 13:
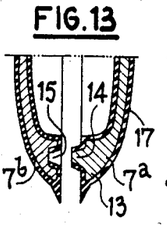
FIGS. 13 and 14, one one hand, and 15 and 16, on the other, are partial sectional views taken in a diametral plane containing the flow axis and illustrating two manners of assembling according to the invention two semi-closure members so as to form a single closure member, these Figures illustrating in section the assembling means and the lower part of the seal element.
Figure 14:
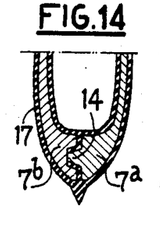
Figure 15:
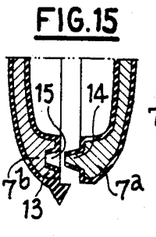
Figure 16:
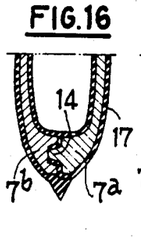

These two parts 7a, 7b are formed by thin shells (FIG. 13) which are reinforced, i.e. thickened at 13, on each side of the closure member in the region of the axis X—X, so as to include at these places assembly means formed by a pair of conical studs 14 which project from a semi-closure member (for example 7a) and are fitted in corresponding conical cavities 15 of the other semi-closure member (7b). Also provided are inner projections 16 which bear against each other (FIG. 17) and are disposed on both the semi-closure members 7a and 7b and constitute spacer members which preclude the crushing of the thin walls of the closure member 7 when a rubber cover or fitting 17 is applied on the closure member by a moulding operation, i.e. is injected under pressure in a mould containing the closure member.

Figure 10:
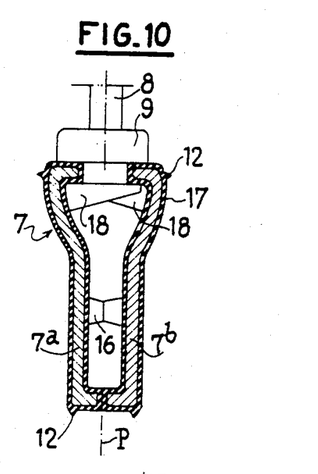
FIG. 10 is a sectional view of the closure member taken on line 10—10 of FIG. 6.

Further, as can be seen in FIG. 10, the two parts 7a, 7b include internally two inner lugs 18 which extend from a part 7a and bear against the upper horizontal inner wall of the other part 7b, and vice-versa, just below the nut case 9, these lugs extending across the joint plane P. These lugs preclude any separation of the parts 7a, 7b by a shear movement thereof when closing the valve, should any foreign body create an obstacle on one side of the plane of symmetry P.

The seal element of elastomer 17 having a variable thickness is thickened so as to form the seal bead or crest 12 which embodies the seal line 61 and is thinned down in the plane of symmetry P—P or the assembly plane of the parts 7a, 7b. The two parts 7a, 7b are covered independently of each other throughout their surface internally and externally, including the bearing projections 16 and the studs 17, by the seal element 17. They are rendered rigid with each other by means of an adhesive product and consequently without screws. Only the end of the studs 14 and the bottom of the cavities 15 are devoid of the cover 17.

Owing to their shape, each of the parts 7a, 7b constitutes an object without undercuts and consequently mouldable without a core.

It will be observed, in comparing FIGS. 13-14 and FIGS. 15-16, that the crest 12 of the seal element 17 may be divided into two symmetrical parts on each part 7a, 7b (FIGS. 13-14) or it may exist only on a single closure member part, for example 7b, the other part 7a being correspondingly truncated (FIGS. 15-16), so that the assembly joint forms in this region a right-angled labyrinth which opposes possible entry of fluid between the two parts of the closure member.

Figure 17:
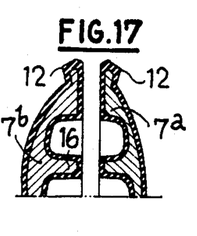
FIG. 17 is a partial sectional view taken in a horizontal plane located a little below the flow axis and showing the configuration of the semi-closure members.

It will be further observed, in comparing the section of FIG. 17 to that of FIGS. 13 to 16, that in the upper seal portion and below the diametral zone of axis X—X, the seal bead 12 has a different orientation to that of the bead 12 located in the lower portion; in the latter, the bead 12 bears against a surface which is closely similar to or coincides with the cylindrical cavity 4, whereas, in the upper levels, it bears against a surface which becomes roughly transverse to the axis X—X, as described hereinbefore. Thus the bead 12 is throughout directed toward the surface 6.

The closure member 7 formed by the adhered assembly of the parts 7a, 7b, comprises on the periphery thereof, convex surfaces which correspond to concave surfaces forming the seat 6.

By way of a modification, the closure member 7 may be in a single piece, but its moulding is more difficult than when it is in two parts.

There will now be considered the horizontal projections of the seal lines of the gate valve according to the invention (FIGS. 20 and 21) and of the gate valve of French patent No. 71 16057.

Under the effect of the upstream or downstream pressure of the conveyed fluid, the closure member 7 in its closing position is applied against the part of the seat 6 which is opposed to this pressure, and the seal line 61 is A, B, $C^2$ (FIGS. 20 and 21) in projection on the plane Q of the section of FIG. 5.

If this seal line is projected onto the diametral plane containing the axis X—X and perpendicular to the axis Y—Y, there is obtained for the second embodiment of the invention the crescent-shaped crosshatched area of the lower part of FIG. 21. This area represents the surface on which a force must be exerted in order to open the closure member and overcome the pressure that the fluid exerts thereon. The resistance to overcome for opening the closure member 7 is termed the bottom effect. This resistance or bottom effect is the product of the pressure to be overcome by the projected crosshatched area of FIG. 21. Thus it can be seen that this bottom effect or this resistance to be overcome is the greater, for a given pressure to be overcome, as the projected area is larger.

It can be seen, by comparison, that the projected area of FIG. 20 in respect of the closure member 7 of the second embodiment of the invention, is substantially reduced relative to that of the closure member of the French patent No. 71 16057 of the Applicant (the seal line and the crosshatched projected area of FIG. 19) for a given diameter of the flow tube 4.

Numerical example.

In respect of an inside diameter of the flow cavity 4 of 150 mm and for a pressure of 16 bars to be overcome when opening the closure member, the projected area (FIG. 19) of a closure member of said prior patent of the Applicant was 250 sq.cm and the opening force or bottom effect was 4,000 kg.

In respect of a closure member according to the second embodiment of the invention, the projected area is reduced to 50 sq.cm (FIG. 20) and the force to overcome when opening the valve is reduced to 800 kg.

It will be observed in FIG. 20 (projected area in respect of first embodiment) that the projected area is still smaller that that of FIG. 21 and consequently smaller than that of FIG. 19 corresponding to the prior gate valve.

Owing to this substantial reduction in the bottom effect, an actuator of lower power and smaller overall size may be employed with the gate valve according to the invention.

Further, the upper part of the diagrams of FIGS. 19 to 21 illustrates the reduction in the longitudinal overall size, i.e. the distance between the flanges of the tube 2 measured parallel to the axis X—X, for a given diameter of the cavity 4, relative to a gate valve in accordance with the prior patent No. 71 16057 of the Applicant for a given minimum angle between the axis X—X and the plane tangent to the seal surface along the seal line.

The closure member of the invention retains, owing to the shape of the seat 6 and the corresponding shape of the parts 7a and 7b of the closure member 7, the advantage of approaching or moving away from the seat 6 with a minimum of friction, since the surfaces which must be applied against each other for achieving the seal move with respect to each other practically without sliding. The advantageous result is that the seal element 17 of elastomer, and in particular its seal bead 12, is subjected to the minimum amount of wear.

Modifications of the two foregoing embodiments will now be described. These modifications concern only the lower part of the seal surface 6 and relate to the case where the flow tube 2 has an inner or outer projection.

Modification of FIGS. 22 to 24.

The tubular body 1 has a transverse chamber 20 on each side of the transverse plane P and consequently around the axis Y—Y, resulting in an outer enlargement or projection from the lower generatrices of the tube 2. The chamber 20 acts as a housing for the lower part of the closure member at the end of its valve-closing travel.

This chamber has the shape of a cylindrical ruled surface whose generatrices are parallel to those of the cylindrical cavity 4 and are connected to the latter by walls parallel to the plane P. Consequently, the seal surface of the seat of the closure member is simply modified by replacing the lower cylindrical part 65 by a lower cylindrical part 66 which coincides both with a part of the cylindrical cavity 4 and with the chamber 20. Consequently, the lower portion 66 is a ruled surface which is partly cylindrical and partly of a shape which is downwardly elongated beyond the cylindrical shape so that the rectilinear generatrices thereof gradually change from those of the cavity 4 to those of the chamber 20 with which latter they finally coincide.

Figure 25:
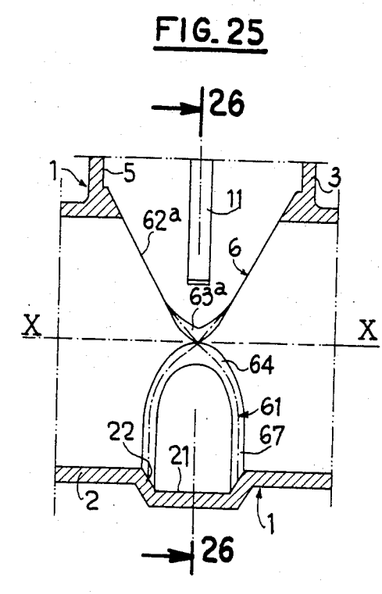
FIG. 25 is a longitudinal sectional view of another modification similar to that of FIG. 22 but in which the hollow cavity is connected to the flow tube by inclined walls instead of being connected to the flow tube by vertical walls.
Figure 26:
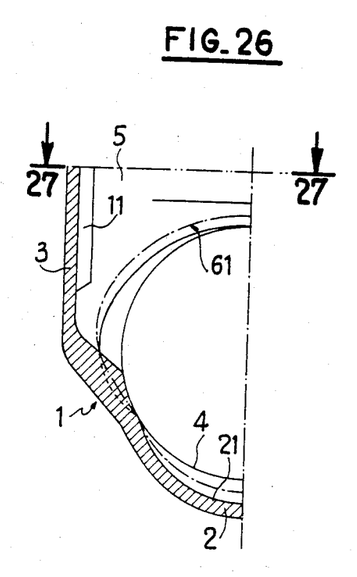
FIGS. 26 and 27 are half-sectional views taken respectively along lines 26—26 of FIG. 25 and 27—27 of FIG. 26.
Figure 27:
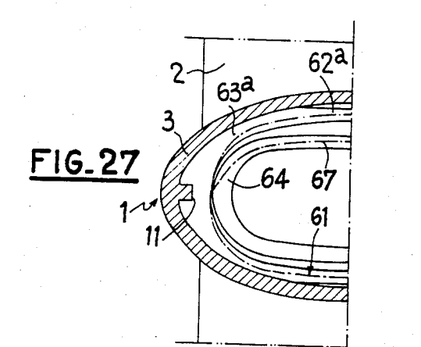

Modification of FIGS. 25 to 27.

The tubular body 1 has, as before, a transverse chamber 21 which projects outwardly from the tube 2, but this chamber is connected to the cavity 4 by chamfers 22. The lower portion 65 of the seal surface is replaced by a lower portion 67 and has rectilinear generatrices which gradually change between those of the cylindrical cavity 4 and those of the chambers 22.

Figure 28:
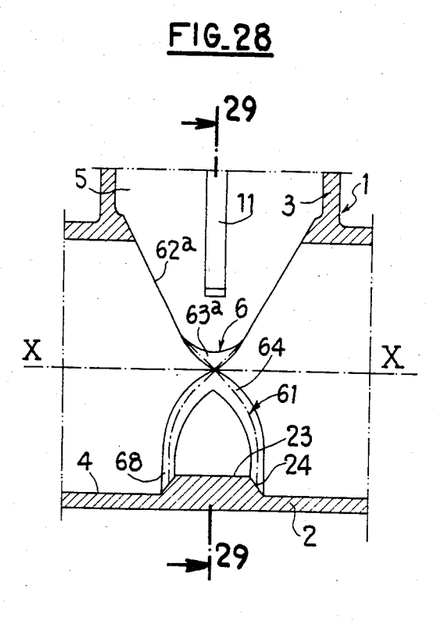
FIG. 28 is a longitudinal sectional view of another modification similar to that of FIG. 22 but in which the lower generatrices of the flow tube have a deviation forming a projection inside this tube.
Figure 29:
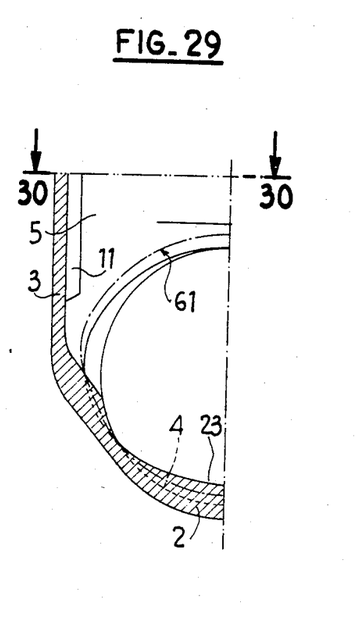
FIGS. 29 and 30 are half-sectional views taken respectively along lines 29—29 of FIG. 28 and 30—30 of FIG. 29.
Figure 30:
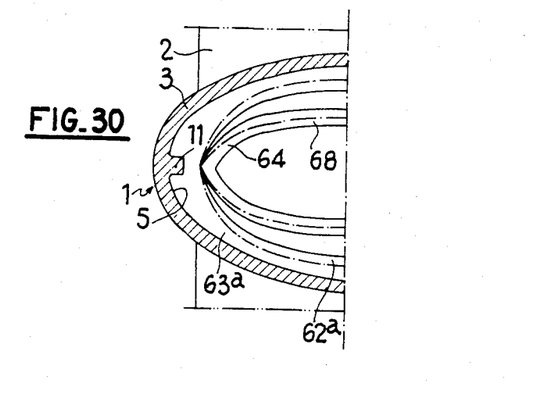
Figure 31:
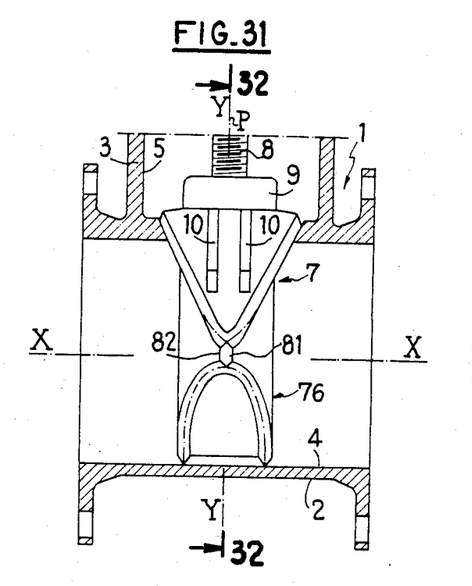
FIGS. 31 to 34 are views similar to FIGS. 5 to 8 respectively relating to a modification of the second embodiment of the invention.
Figure 32:
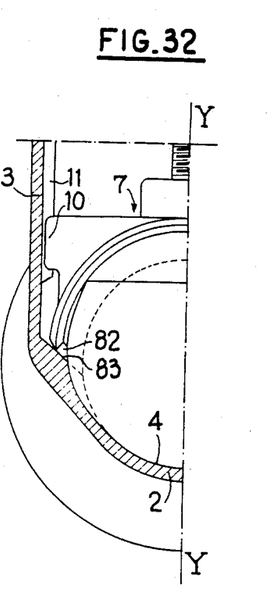

Modification of FIGS. 28 to 30.

The tubular body 1 has an inner projection 23 on each side of the transverse plane P. This projection 23 is a ruled surface forming a cylindrical thickening whose axis is parallel to the axis X—X and whose radius is larger than the radius of the cavity 4. It is connected to the latter by circular chamfers 24.

The lower portion of the closure member 7 must bear in a fluidtight manner against the inner projection 23 and in particular against the circular chamfers 24. Consequently, the seal surface of the seat of the closure member is modified by replacing the lower cylindrical portion 65 by a lower portion 68 which has a ruled surface the generatrices of which gradually change from the generatrices of the cavity 4, which are parallel to the axis X—X, to those of the chamfers 24.

In each of the foregoing three modifications, the lower portion of the closure member 7, and in particular of its seal line 71, is of course modified in the same way as the seat surface. Moreover, it will be understood that the same modifications may be envisaged for the first embodiment of the invention.

In the modifications of FIGS. 25 to 27 and 28 to 30, it is essential to note that the angle that the plane tangent to the bearing surface 22 or 24 along the seal line makes with the axis Y—Y is at least equal to the minimum angle $\alpha$ of 20°. Thus a constant angle of at least 20° is obtained throughout the length of the seal line. The advantage of this is that, throughout the periphery of the seat, the elastic seal element 17 operates under the same conditions. Thus the compression of the seal element, considered perpendicularly to the bearing surface, is constant throughout the periphery of the seat in respect of a given penetration of the closure member. If the penetration of the closure member is modified, this compression changes its value but retains the new value uniformly throughout the periphery of the seat.

Another advantage of these two modifications is that the closure member is guided and supported in the lower part thereof at the end of the closure. This is an advantage which is of particular interest when it is considered that the bearing and guiding surface of the ears 10 of the closure member on the guides 11 of the body is of limited height.

Modification of FIGS. 31 to 34.

It will be observed that in the two embodiments of FIGS. 1 to 4 and FIGS. 5 to 8, there is on the seal line a critical crossing point B, $B^2$ which must coincide on the seat and on the seal element 17 of the closure member 7.

If the manufacturing tolerances of the seat and of the closure member are too wide, there is a risk of a slight offset between this crossing point on the seat and on the closure member and consequently a risk of a defective seal.

Figure 33:
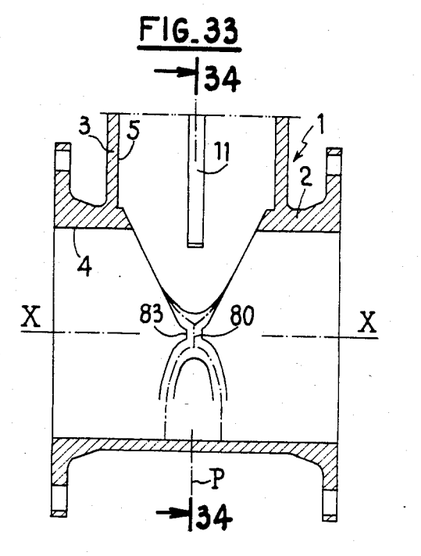
Figure 34:
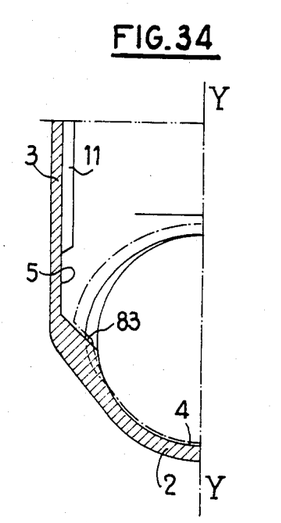

This is why, in the case where wide manufacturing tolerances are employed, it is advisable to replace this critical crossing point by a short seal line 80 forming a connection line in vertical lateral projection onto the plane Q. This line 80 is embodied by a crest line 81 on the closure member on each side of the diametral plane having the axis X—X and in the vicinity of the latter, this crest line being located on a small straight segment 82 of the seal rib of the closure member (FIG. 31), and by a flat face 83 interconnecting the surfaces 63 and 64 on the seat (FIG. 33).

Thus a slight offset to one side or the other of the plane of symmetry P—P is possible between the seal and the closure member since there will always exist a sealing contact between the seal crest 81 of the straight segment 82 and the corresponding flat face 83 of the seat.

Figure 35:
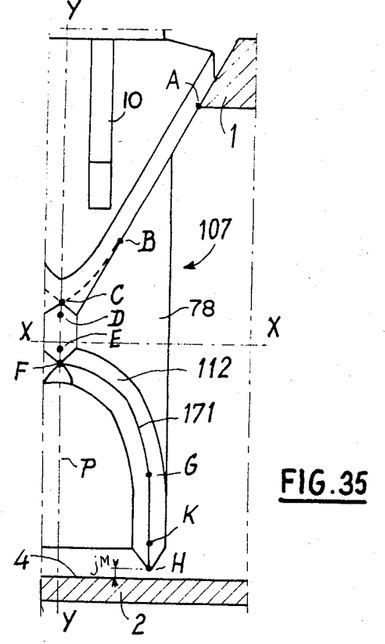
FIG. 35 is a partial longitudinal sectional view of another embodiment of the gate valve according to the invention.
Figure 36:
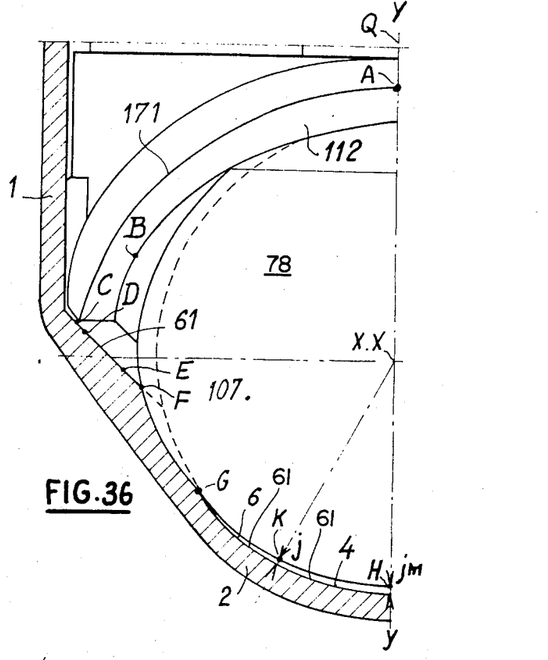
FIG. 36 is a sectional view taken on line 36—36 of FIG. 35 of this gate valve.

The gate valve shown in FIGS. 35 and 36 has a body 1 identical to that of FIGS. 31 to 34. The closure member or gate is generally similar to the closure member 7 of FIGS. 31 and 32. The sole difference is in the shape of the crest line 171 of its seal bead 112.

Indeed, in the upper and intermediate portions of the bead 112, i.e., in following on each side of the plane of symmetry P, the path ABCDEFG, the crest line 171 has the same shape as the seal line 61 of the seat but is slightly expanded, i.e. offset at each point a constant distance or interference i perpendicularly to the seat surface 6.

In the lower portion of the bead 112 between the two points G which are the upper limits of the portion of the surface 6 coinciding with the cavity 4 of the flow tube 2, the shape of the crest line 171 is on the other hand set back relative to that of the seal line 61. More precisely, when viewed along the axis X—X (FIG. 35), the lower portion of the line 171 has the shape of an arc of the circle whose radius is slightly larger than the radius of the cavity 4 of the flow tube.

Figures 37, 38, 39, 40, 41:
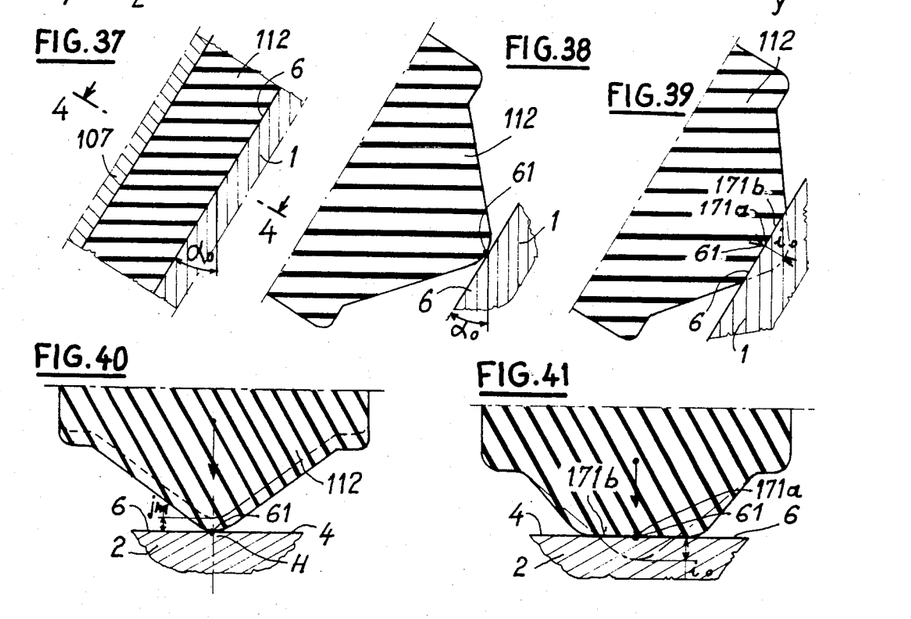
FIG. 37 illustrates, in longitudinal section of the bead, the first contact of the latter with the seat.
FIG. 38 is a sectional view taken on line 38—38 of FIG. 37.
FIG 39 is a view similar to FIG. 38 but corresponding to the complete closure of the closure member.
FIG. 40 shows, in cross-section of the bead, the contact of the latter with the seat in the lower point of the flow tube.
FIG. 41 is a view similar to FIG. 40 but corresponding to the complete closure of the closure member.

When the closure member 107 descends for closing the flow cavity 4, a moment $t_1$ is reached at which all the points of the line 171 located above the two points G, namely all the points such as A, B, C, D, E, F and G, come simultaneously in contact with the line 61 of the seat (FIGS. 41 and 42). At the same moment $t_1$, a radial clearance j exists below the two points G, and this clearance gradually increases from a zero value at the points G to a maximum value jM at the lower point H in the plane of symmetry P on the axis Y—Y.

When the closure member 107 continues to descend in the vertical travel s to its fully closed position, in the upper and intermediate regions of the bead 112, i.e. above the two points G, this bead is progressively crushed on the surface 6 without sliding, or substantially without sliding, on this surface, to a crushed or interference value i (FIG. 39). As in all these regions A, B, C, D, E, F, G, the plane tangent to the surface 6 along the line 61 makes an angle which is roughly constant with the direction Y—Y of displacement, this angle being for example 20° or 30°, we have at all points $i = s \cdot \sin \alpha_o = \text{constant} = i_o$.

Below the two points G, in the preceding embodiments, the contact 171-61 occurs simultaneously at the time $t_1$ as above the points G. As in this region the angle α varies from $\alpha_o$ to 90°, the interference $i = s \cdot \sin \alpha$ varies from one point to the other from $s \cdot \sin \alpha_o$ at the point G to $s \cdot \sin 90° = s$ at the point H.

On the other hand, in FIGS. 35 and 36, we have below the points G: $i = s \cdot \sin \alpha - j$, so that it is sufficient to choose $j = s \cdot \sin \alpha - i_o = s (\sin \alpha - \sin \alpha_o)$ (I) at each point so that the interference i be still equal to $i_o$ in this lower region. The formula (I) is thus of the type $j = a \sin - b$, with $a = s$ and $b = s \cdot \sin_o$.

By way of example, with $\alpha_o = 30°$, the interferences i at the points A and H at the time $t_2$ of complete fluid-tight closure, after a travel s of 2 mm from the time $t_1$ and a clearance at the point H of 1 mm at the time $t_1$, are calculated in the following manner with the formula (I): from the point A to the point G:

$i_o = 2 \times \sin 30° = 1$ mm at the point H (j=1 mm):

$i = 2 \times \sin 90° - 1 = 1$ mm at an intermediate point K below G and angularly spaced 30° from H, we have α=60° and a radial clearance j=0.732 mm must be provided in order to obtain the same interference:

$i = 2 \times \sin 60° - 0.732 = 2 \times 0.866 - 0.732 = 1$ mm

In this way there is obtained an interference or a crushing i which is constant and equal to $i_o$ throughout the periphery of the seal bead. This property is of interest and advantageous, since an insufficient interference at certains points is liable to result in a defective seal whereas an excessive interference results in in great wear of the seal bead.

The foregoing formula (I), namely $j = s \cdot \sin \alpha - i_o 32 s (\sin \alpha - \sin \alpha_o)$, gives the contour of the crest line 171 providing a uniform value $i_o$ of i throughout its periphery. In practice, there may be adopted below the two points G a shape of an arc of a circle of radius R1 for the line 171 slightly greater than the radius R of the cavity 4 with:

$R1 = R + i_o$

It will be understood that in the completely closed position of the valve, the mean line 171a of the crushed surface 171b of the bead 171 coincides with the seal line 61 of the seat 6, whereas in the preceding embodiments, it was the crest line 71 which coincided with this line 61 at time $t_1$.

The arrangement described with reference to FIGS. 35 and 36 may be applied to all the preceding embodiments in which the angle between the tangent plane and the axis Y—Y varies in the lower part of the seat, i.e. in all the preceding embodiments except those of FIGS. 25 to 27 and 28 to 30. When the crossing of the semi-seal lines is at a point (FIGS. 1 to 30), the intersection point replaces the vertical section C, D, E, of FIGS. 1 and 2, but the remainder of the bead is as defined hereinbefore.

It must be understood that the expression "crest line" employed hereinbefore must be understood in the broadest sense, since this line may be in some cases a surface of small width in the case of a seal bead having a rectangular, trapezoidal or a half-moon shape.

Throughout the foregoing description it has been assumed that the axis X—X is horizontal and the axis Y—Y is vertical. However, it must be understood that the gate valve according to the invention may be employed in any desired orientation, for example with the flow axis X—X vertical or inclined.

Having now described my invention what I claim as new and desire to secure by Letters Patent is:

1. In a gate valve comprising a body having a horizontal cylinder flow tube which has a flow axis (X—X) and an inner cylindrical flow surface, means defining two seat surfaces partly surrounding and also partly comprising the cylindrical flow surface, and a closure member carrying seal beads of elastomer and guided in said body to be movable in translation along a vertical axis (Y—Y) between a valve opening position and a valve closing position, said beads being adapted to bear on the seat surfaces in said valve closing position of the closure member and having substantially the same general shape as the seat surfaces; the improvement wherein the two seat surfaces provide for sealing against the beads and define two continuous seal lines (61) which define closed curves and which, in projection in a first symmetry plane (Q) containing said flow axis (X—X) and said vertical axis (Y—Y), intersect in a second symmetry plane (P) which contains said vertical axis (Y—Y) and is perpendicular to said flow axis (X—X) and intersect in the vicinity of a horizontal diametral plane containing said flow axis in a substantially X configuration, respective upper parts of said two seal lines tapering downwardly to a vertex portion located at least close to said horizontal plane when viewed in said direction, said respective upper portions of respective lower parts of said two seal lines tapering progressively upwardly to a vertex portion located at least close to said horizontal plane when viewed in said direction, portions of said two seal lines which are in said vicinity passing through said horizontal plane and inclined thereto at an angle other than in the projection on said first symmetry plane (Q); and wherein the closure member comprises two semi-closure members which are assembled on a vertical joint plane which is perpendicular to said flow axis, each semi-closure member comprising a thin shell having reinforcing means in abutting relation to the other shell, stud means on one of said shells and cavity means on the other shell being in interengaged relation so as to position a semi-closure member with respect to the other semi-closure member.

2. A gate valve according to claim 1, wherein the two seal lines pass through a point in said horizontal diametral plane.

3. In a gate valve comprising a body having a horizontal cylinder flow tube which has a flow axis (X—X) and an inner cylindrical flow surface, means defining two seat surfaces partly surrounding and also partly comprising the cylindrical flow surface, and a closure member carrying seal beads of elastomer and guided in said body to be movable in translation along a vertical axis (Y—Y) between a valve opening position and a valve closing position, said beads being adapted to bear on the seat surfaces in said valve closing position of the closure member and having substantially the same general shape as the seat surfaces; the improvement wherein the two seat surfaces provide for sealing against the beads and define two continuous seal lines (61) which define closed curves and which, in projection in a first symmetry plane (Q) containing said flow axis (X—X) and said vertical axis (Y—Y), intersect in a second symmetry plane (P) which contains said vertical axis (Y—Y) and is perpendicular to said flow axis (X—X) and intersect in the vicinity of a horizontal diametral plane containing said flow axis in a substantially X configuration, respective upper parts of said two seal lines tapering downwardly to a vertex portion located at least close to said horizontal plane when viewed in said direction, said respective upper portions of respective lower parts of said two seal lines tapering progressively upwardly to a vertex portion located at least close to said horizontal plane when viewed in said direction, portions of said two seal lines which are in said vicinity passing through said horizontal plane and inclined thereto at an angle other than in the projection on said first symmetry plane (Q); and wherein the closure member comprises two semi-closure members which are assembled on a vertical joint plane which is perpendicular to said flow axis, each semi-closure member comprising a thin shell having reinforcing means in abutting relation to the other shell, stud means on one of said shells and cavity means on the other shell being in interengaged relation so as to position a semi-closure member with respect to the other semi-closure member; and wherein each seat surface is a ruled surface which comprises an upper curved portion which is substantially tansverse to said flow axis, a lower curved portion which coincides with said inner cylindrical flow surface and, between said two portions, above and below said horizontal diametral plane, an intermediate transition portion (63, 64) which has a substantially helical contour when viewed in said direction and is in the shape of a turning ramp which interconnects said upper and lower portions by turning around said inner cylindrical flow surface as close as possible to said flow axis, said upper portion of said intermediate helical transition portion, located on one side relative to the symmetry plane of the closure member and seat surfaces, being continued by said lower portion of said intermediate helical transition portion, located on the opposite side relative to said symmetry plane.

4. A gate valve according to claim 3, wherein said upper portion of each seat surface located above said horizontal plane is contained in a plane, the planes of the upper portions converging toward said flow axis and being extended by curved surfaces of connection to said lower portions located below said horizontal plane.

5. A gate valve according to claim 1, 2, 3 or 4, wherein each semi-closure member comprises an inner projection which bears against a horizontal end surface of the other semi-closure member.

6. In a gate valve comprising a body having a horizontal cylinder flow tube which has a flow axis (X—X) and an inner cylindrical flow surface, means defining two seat surfaces partly surrounding and also partly comprising the cylindrical flow surface, and a closure member carrying seal beads of elastomer and guided in said body to be movable in translation along a vertical axis (Y—Y) between a valve opening position and a valve closing position, said beads being adapted to bear on the seat surfaces in said valve closing position of the closure member and having substantially the same general shape as the seat surfaces; the improvement wherein the two seat surfaces provide for sealing against the beads and define two continuous seal lines (61) which define closed curves and which, in projection in a first symmetry plane (Q) containing said flow axis (X—X) and said vertical axis (Y—Y), intersect in a second symmetry plane (P) which contains said vertical axis (Y—Y) and is perpendicular to said flow axis (X—X) and intersect in the vicinity of a horizontal diametral plane containing said flow axis in a substantially X configuration, respective upper parts of said two seal lines tapering downwardly to a vertex portion located at least close to said horizontal plane when viewed in said direction, said respective upper portions of respective lower parts of said two seal lines tapering progressively upwardly to a vertex portion located at least close to said horizontal plane when viewed in said direction, portions of said two seal lines which are in said vicinity passing through said horizontal plane and inclined thereto at an angle other than in the projection on said first symmetry plane (Q); and wherein the closure member comprises two semi-closure members which are assembled on a vertical joint plane which is perpendicular to said flow axis, each semi-closure member comprising a thin shell having reinforcing means in abutting relation to the other shell, stud means on one of said shells and cavity means on the other shell being in interengaged relation so as to position a semi-closure member with respect to the other semi-closure member; and wherein the seal bead is formed by a thickening of a cover element which covers the whole of the closure member and the closure member comprises two semi-closure members which are assembled on a vertical joint plane which is perpendicular to said flow axis, each semi-closure member comprising a thin shell having reinforcing means and positioning means for positioning the semi-closure member with respect to the other semi-closure member, and an inner projection which bears against a horizontal end surface of the other semi-closure member, each semi-closure member being covered with said cover element on inner and outer surfaces thereof.

7. A gate valve according to claim 6, wherein the two seal lines pass through a point in said horizontal diametral plane.

8. A gate valve according to claim 6, wherein each seat surface is a ruled surface which comprises an upper curved portion which is substantially transverse to said flow axis, a lower curved portion which coincides with said inner cylindrical flow surface and, between said two portions, above and below said horizontal diametral plane, an intermediate substantially helicoidal transition portion in the shape of a turning ramp which interconnects said upper and lower portions by turning around said inner cylindrical flow surface as close as possible to said flow surface.

9. A gate valve according to claim 8, wherein said upper portion of each seat surface located above said horizontal plane is contained in a plane, the planes of the upper portions converging toward said flow axis and being extended by curved surfaces of connection to said lower portions located below said horizontal plane.

* * * * *